Sept. 20, 1966  D. E. HOFFMAN  3,273,327
PLASTIC AIR FILTERS
Filed June 18, 1964
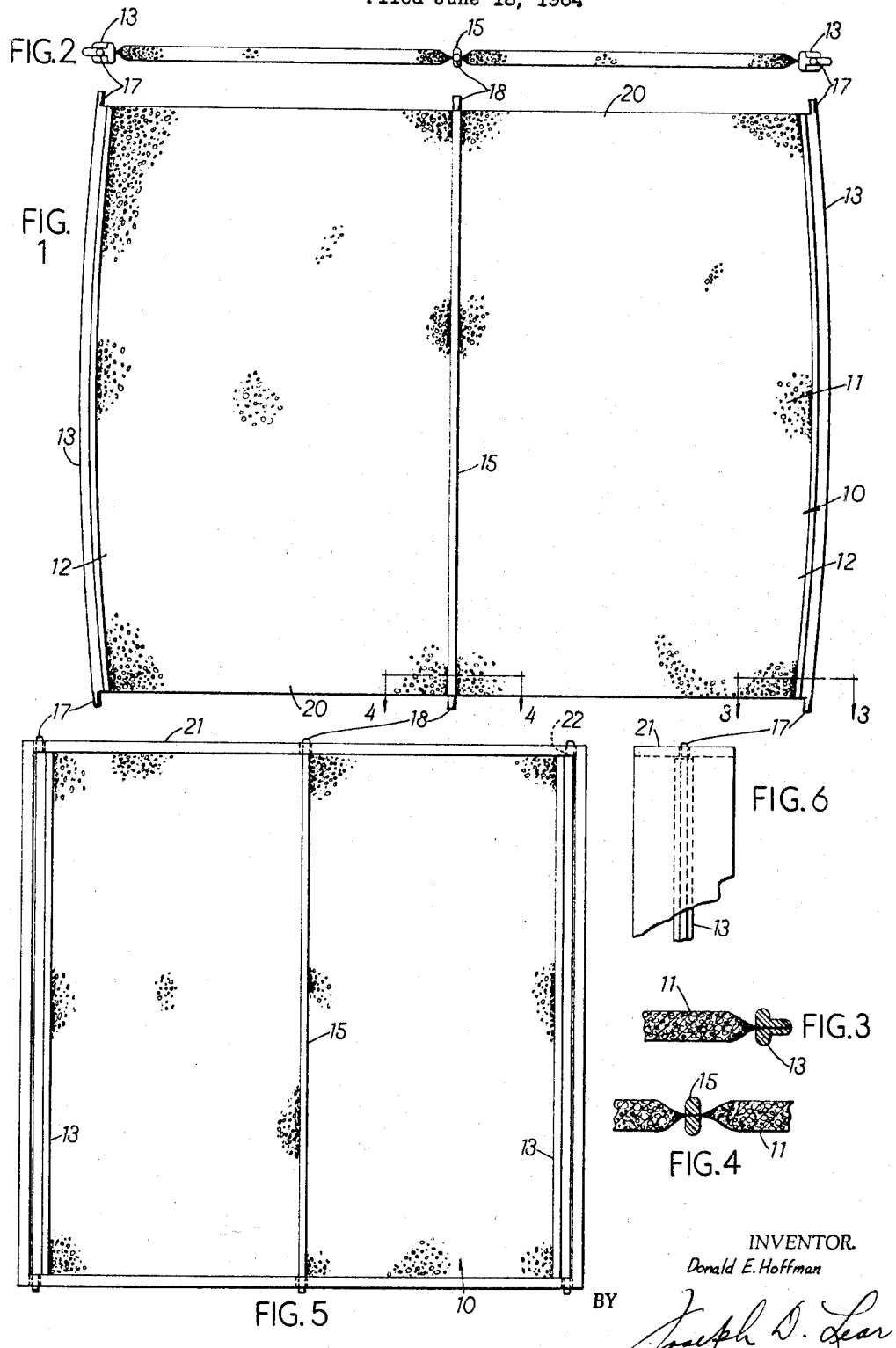
INVENTOR.
Donald E. Hoffman
BY
ATTY.

United States Patent Office 3,273,327
Patented Sept. 20, 1966

3,273,327
PLASTIC AIR FILTERS
Donald E. Hoffman, West Seneca, N.Y., assignor to Fedders Corporation, Edison, N.J.
Filed June 18, 1964, Ser. No. 376,097
1 Claim. (Cl. 55—507)

This invention relates to filter units for use in filtering air in air conditioning hot air furnaces and the like.

An object of the invention is to provide improvements in filter units directed to ease of installation and accuracy of application thereof so that leakage of unfiltered air past such unit is obviated. A further object of the invention is to provide a filter of such character in a one piece plastic structure including its own mounting and reinforcing means. In the drawings:

FIG. 1 is a front view of the filter unit of the invention.

FIG. 2 is a top view thereof.

FIGS. 3 and 4 are enlarged sections on the lines 3—3 and 4—4 of FIG. 1.

FIG. 5 is a front view of an air duct wherein the filter unit of the invention is positioned.

FIG. 6 is a fragmentary side view of FIG. 5.

The filter unit 10 consists of a body 11 of inter-cellular foamed plastic material which is characterized by its ability to be stretched without damage. The side margins 12 of the body 11 are reinforced by T-shaped stiles 13 (FIG. 3) of solid plastic material surrounding the marginal body material. When the area of the body dictates the need for reinforcement one or more spaced struts 15 (FIG. 4) may be positioned between the stiles 13. The stiles 13 and the strut 15 are formed at their upper and lower extremities with projecting pintles 17 and 18, respectively, which provide mounting means as will be presently described.

It will be observed in FIG. 1 that in its relaxed state of the body 11, the side margins thereof and the coextensive stiles 13, are curved. This is to permit the upper and lower margins 20 to be stretched when the unit is mounted in an air duct 21 (FIG. 5). It will be seen that the duct 21 is provided with spaced holes 22 in an aligned pattern to receive the pintles 17 and 18. Thus, when the unit 11 is mounted by insertion of the pintles in such holes, the curvature of the stiles 13 is such that under tension it becomes rectilinear in shape to correspond with the rectilinear shape of the duct 21. It will be understood that the stiles 13 and struts 15, being of an elastic material may be bowed or bent into a duct without great difficulty.

In the process of forming the unit 10, which is old in the art, it may be explained that the body 11 is placed in a mould and then solid plastic material is injected to form the stiles 13 and strut or struts 15 to provide in effect an integral structure.

I claim:

The combination with a rectilinear duct having spaced opposed mounting holes in its upper and lower walls, of a filter unit for installation in the duct, said unit having parallel upper and lower margins adapted to contact the side walls of the duct, and outwardly curved side margins adapted to tangentially contact the side walls of the duct, said unit being of resilient plastic foam material and having solid marginal plastic reinforcements on its curved sides and intermediate solid plastic reinforcements extending between the parallel margins of said unit opposed pintles at the ends of the marginal plastic reinforcements, the curvature of said reinforced sides being such when said unit is mounted in said duct by stretching to engage the pintles thereof in the mounting holes of the duct, the shape of said unit becomes rectilinear to completely cover the cross section of said duct.

References Cited by the Examiner
UNITED STATES PATENTS

| | | | |
|---|---|---|---|
| 2,121,174 | 6/1938 | Maynard | 160—371 |
| 2,991,843 | 7/1961 | Bell. | |
| 3,107,991 | 10/1963 | Taussig | 55—511 |
| 3,183,285 | 5/1965 | Boylan | 55—490 X |

ROBERT F. BURNETT, *Primary Examiner.*